United States Patent [19]
Stuart

[11] Patent Number: 6,050,824
[45] Date of Patent: *Apr. 18, 2000

[54] REPRESENTATIONS OF LETTERS OF AN ALPHABET

[76] Inventor: Gayle J. Stuart, 15 Old Topsfield Rd., Boxford, Mass. 01921

[*] Notice: This patent issued on a continued prosecution application filed under 37 CFR 1.53(d), and is subject to the twenty year patent term provisions of 35 U.S.C. 154(a)(2).

[21] Appl. No.: 09/096,793

[22] Filed: Jun. 12, 1998

Related U.S. Application Data

[60] Provisional application No. 60/050,025, Jun. 13, 1997.

[51] Int. Cl.[7] ............................................. G09B 1/00
[52] U.S. Cl. ........................ 434/159; 434/156; 434/112; 434/113; 434/428
[58] Field of Search .................................... 434/159, 167

[56] References Cited

U.S. PATENT DOCUMENTS

| | | | |
|---|---|---|---|
| 1,584,627 | 5/1926 | Marino | 434/159 |
| 4,315,748 | 2/1982 | Frascara et al. | 434/159 |
| 4,427,390 | 1/1984 | Manger | 434/159 |
| 4,878,844 | 11/1989 | Gasper et al. | 434/159 |
| 5,788,503 | 2/1996 | Shapiro et al. | 434/167 |

FOREIGN PATENT DOCUMENTS

| | | | |
|---|---|---|---|
| 2050034 | 3/1980 | United Kingdom | 434/159 |

*Primary Examiner*—Robert A. Hafer
*Assistant Examiner*—Bena B. Miller
*Attorney, Agent, or Firm*—Gordon E. Nelson

[57] ABSTRACT

Representations of letters of the alphabet have surfaces which have a feel on being touched which are different from the feel of surfaces of other letters. The letters may be presented in a book having a plurality of pages, each page displaying a letter of the alphabet, the surface of the letter having a feel on being touched which is different from the feel of its page and from the feel of other letters. The letters may also have a different appearance from the appearance of other letters. Each letter may have a combination of feel and appearance which is different from the combination of feel and appearance of each of the other letters. The letters may be disposed in a plane which is offset from a plane defined by its page. Each page is preferably split into a first portion which displays the uppercase form of the letter and a second portion which displays the lowercase form of the letter, the first and second portions being capable of being turned independently of one another.

4 Claims, 4 Drawing Sheets

REPRESENTATIONS OF LETTERS OF AN ALPHABET

CROSS-REFERENCE TO RELATED APPLICATION

This application claims priority to U.S. Provisional Application Ser. No. 60/050,025, filed on Jun. 16, 1997.

INTRODUCTION

The present invention is directed to representations of letters of an alphabet, and, more particularly, to the representation of letters having a surface whose feel is different from the feel of the surface of other letters of the alphabet.

BACKGROUND

It is known that human beings learn via multiple senses. Alphabets are typically taught visually by displaying the letter in a book or other written form. Letters are typically displayed in a single color of ink on a plain background. Such a display does not take advantage of the full capabilities of visual learning. Letters are also taught through the sense of sound by speaking the letters aloud. An individual thus typically learns the letters of the alphabet only through the senses of sight and sound. Other senses, such as touch are, therefore, typically not used in the learning of the alphabet.

It is an object of the present invention to provide an improved representation of letters which reduces or wholly overcomes some or all of the aforesaid difficulties inherent in prior known representations. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide an improved representation of letters of the alphabet to enhance learning through the senses of sight, touch, and hearing.

In accordance with a first aspect, a book has a plurality of pages with letters of an alphabet, each letter of the alphabet being displayed on a different page. The surface of each letter has a feel on being touched which is different from a feel of a surface of the page on which it is displayed and from a feel of the surface of others of the letters.

In accordance with another aspect, a book has a binding and a plurality of pages secured along edges thereof to the binding. Each page defines a generally planar surface and is split into a first portion and a second portion, the first and second portions being capable of being turned independently of one another. Each letter of the alphabet is displayed in uppercase form on the first portion of a different page. The surface of each uppercase letter has a feel on being touched which is different from a feel of the surface of the page on which it is displayed and from a feel of the surface of other uppercase letters and is offset from the planar surface of the page on which it is displayed. Each letter of the alphabet is displayed in lowercase form on the second portion of the page displaying the uppercase form. The surface of each lowercase letter has a feel on being touched which is different from a feel of the surface of the page on which it is displayed and from a feel of the surface of other lowercase letters and is offset from the planar surface of the page on which it is displayed.

In accordance with yet another aspect, a representation of a letter of an alphabet, the representation belonging to a set thereof, has (a substrate that does not have the letter's shape and a surface on the substrate.) The surface has the letter's shape and a feel on being touched which is different from feels of surfaces having the shapes of other letters in the set of representations, whereby the feel aids in learning the letter.

Substantial advantage is achieved through the use of the present invention. Specifically, learning of an alphabet can be enhanced by displaying the alphabet in a visually and tactilely appealing manner. Such a display can enhance visual learning, provide learning through the sense of touch, and enhance learning through the sense of hearing by encouraging an individual to sound out the letters.

From the foregoing disclosure, it will be readily apparent to those skilled in the art, that is, those who are knowledgeable or experienced in this area of technology, that the present invention provides a significant technological advance. Preferred embodiments of the present invention can provide improved learning through enhanced use of the senses and the use of an additional sense. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
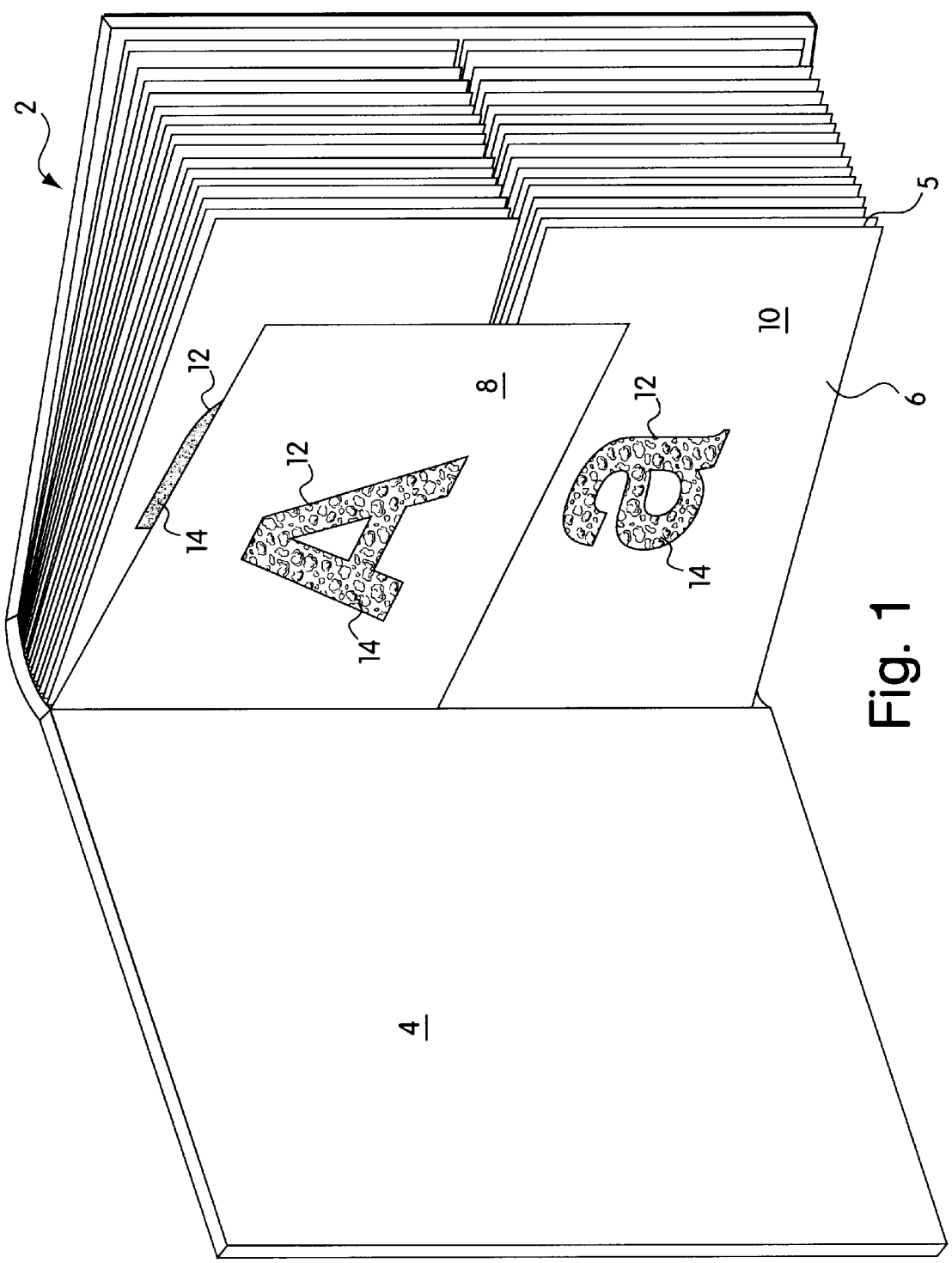
FIG. 1 is a schematic perspective view of a book of the present invention in an opened state.

The figures referred to above are not drawn necessarily to scale and should be understood to present a representation of the invention, illustrative of the principles involved. Some features of the present invention depicted in the drawings have been enlarged or distorted relative to others to facilitate explanation and understanding. The same reference numbers are used in the drawings for similar or identical components and features shown in various alternative embodiments. Representations of letters as disclosed herein, will have configurations and components determined, in part, by the intended application and environment in which they are used.

DETAILED DESCRIPTION OF CERTAIN PREFERRED EMBODIMENTS

Turning now to FIG. 1, book 2 comprises a cover, or binding 4 to which a plurality of leaves 5, supporting pages 6, are secured along edges thereof. Pages 6, in a preferred embodiment, comprise upper portion 8, and lower portion 10, which are separate and can, therefore, be turned independently of one another. Displayed on pages 6 of book 2 are letters 12 of an alphabet. In the illustrated embodiment, the Roman alphabet is displayed in book 2. It is to be appreciated that the present invention is applicable to other alphabets as well In a preferred embodiment, the letter 12 is displayed in uppercase form on upper portion 8 of each page 6 and in lowercase form, designated 12', on lower portion 10. Each letter of the alphabet is displayed on a different page, preferably in alphabetical order to promote learning of the alphabet. It is to be appreciated that letters 12 may be displayed in any desired font.

Pages 6 are typically a single color and free of any illustration or decoration which might distract an individual from the displayed letter. The surface 14 of each letter 12 has a feel on being touched which is different from the surface of the page 6 upon which it is displayed. The surface 14 of each letter 12 also has a different feel than the surface 14 of other letters 12 in book 2. Surface 14 of the uppercase form of each letter 12 preferably has the same feel as the lowercase form 12' of the same letter. Surface 14 of each letter 12 also has, in certain preferred embodiments, a different appearance from the appearance of surface 14 of other letters 12. Surface 14 of the uppercase form of each letter 12 preferably has the same appearance as the lowercase form 12' of the same letter. In a preferred embodiment, the combination of the feel and appearance of each letter 12 is different from the combination of the feel and appearance of each other letter 12 in book 2. The combination of the feel and appearance of the uppercase form of each letter 12 is preferably the same as the combination of the feel and appearance of the lowercase form 12' of the same letter. Therefore, not only is each letter distinguished from the page upon which it is displayed and the other letters by its shape, but it is also distinguished by its appearance and feel.

Figure 2:
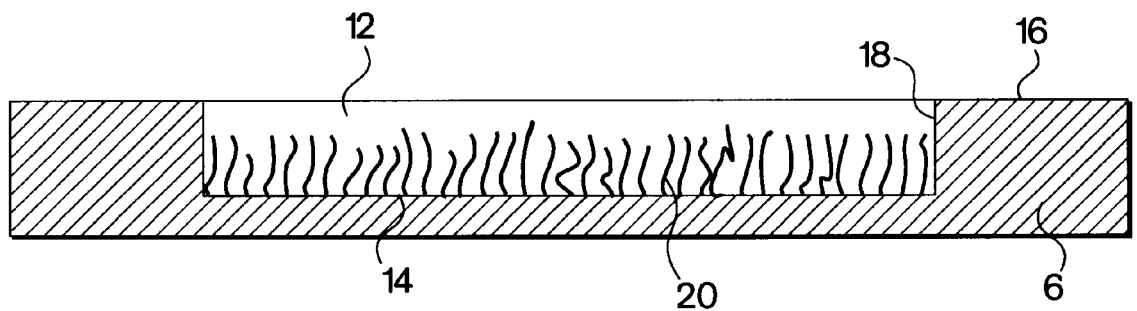
FIG. 2 is a schematic side elevation view in section of an alternative embodiment of a page of the book of FIG. 1.

Turning now to FIG. 2, a preferred construction of page 6 is shown. Page 6 has a generally planar surface 16, and is formed of a mat-board, heavy stock, or other suitable material which will become readily apparent to those skilled in the art given the benefit of this disclosure. A portion of page 6 is cut away, forming recess 18 in the shape of letter 12. Material 20 is then added to the lower surface of recess 18, providing surface 14 of letter 12. Surface 14 is offset in a recessed fashion with respect to the planar surface 16 of page 6. In the illustrated embodiment, material 20 comprises soft fibers secured to surface 14.

An individual learning the alphabet can thus feel surface 14 of letter 12, associating that particular feel with that particular letter, thereby reinforcing their learning through their sense of touch. This tactile learning is also enhanced by the ability of the individual to feel the outline of the letter by running their finger along the edge of recess 18.

Figure 3:
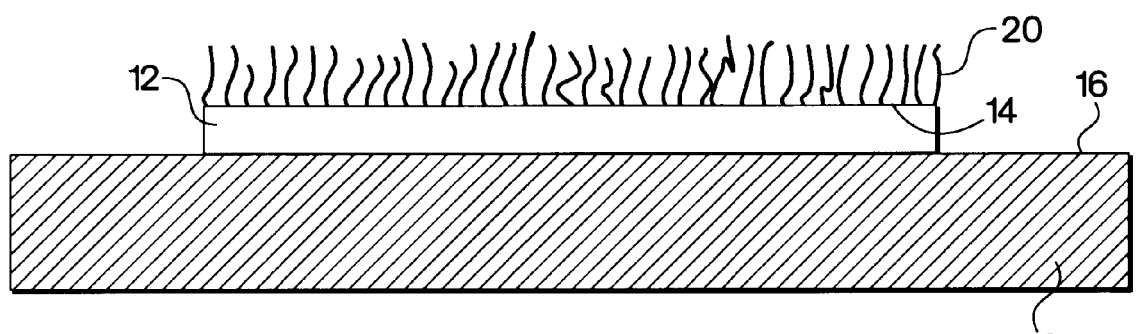
FIG. 3 is a schematic side elevation view in section of another alternative embodiment of a page of the book of FIG. 1.

In another preferred embodiment, shown in FIG. 3, letter 12 is cut from suitable material and secured to page 6 such that surface 14 is raised above surface 16. In this embodiment, the individual can feel the raised outline as well as the surface 14 of letter 12, thereby enhancing the learning of letter 12 through their sense of touch.

Figure 4:
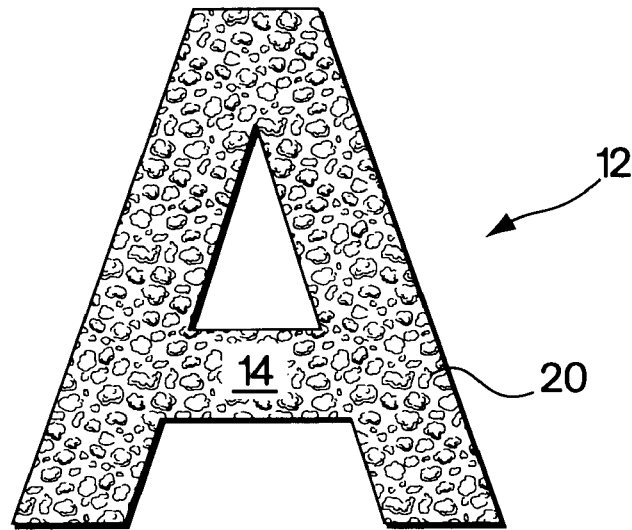
FIG. 4 is a schematic plan view of an alternative embodiment of the surface of a letter on a page of the book of FIG. 1.
Figure 5:
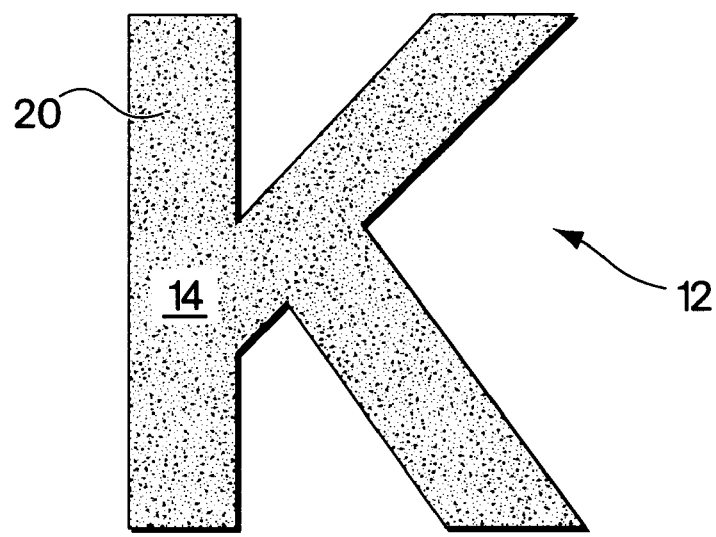
FIG. 5 is a schematic plan view of another alternative embodiment of the surface of a letter on a page of the book of FIG. 1.
Figure 6:
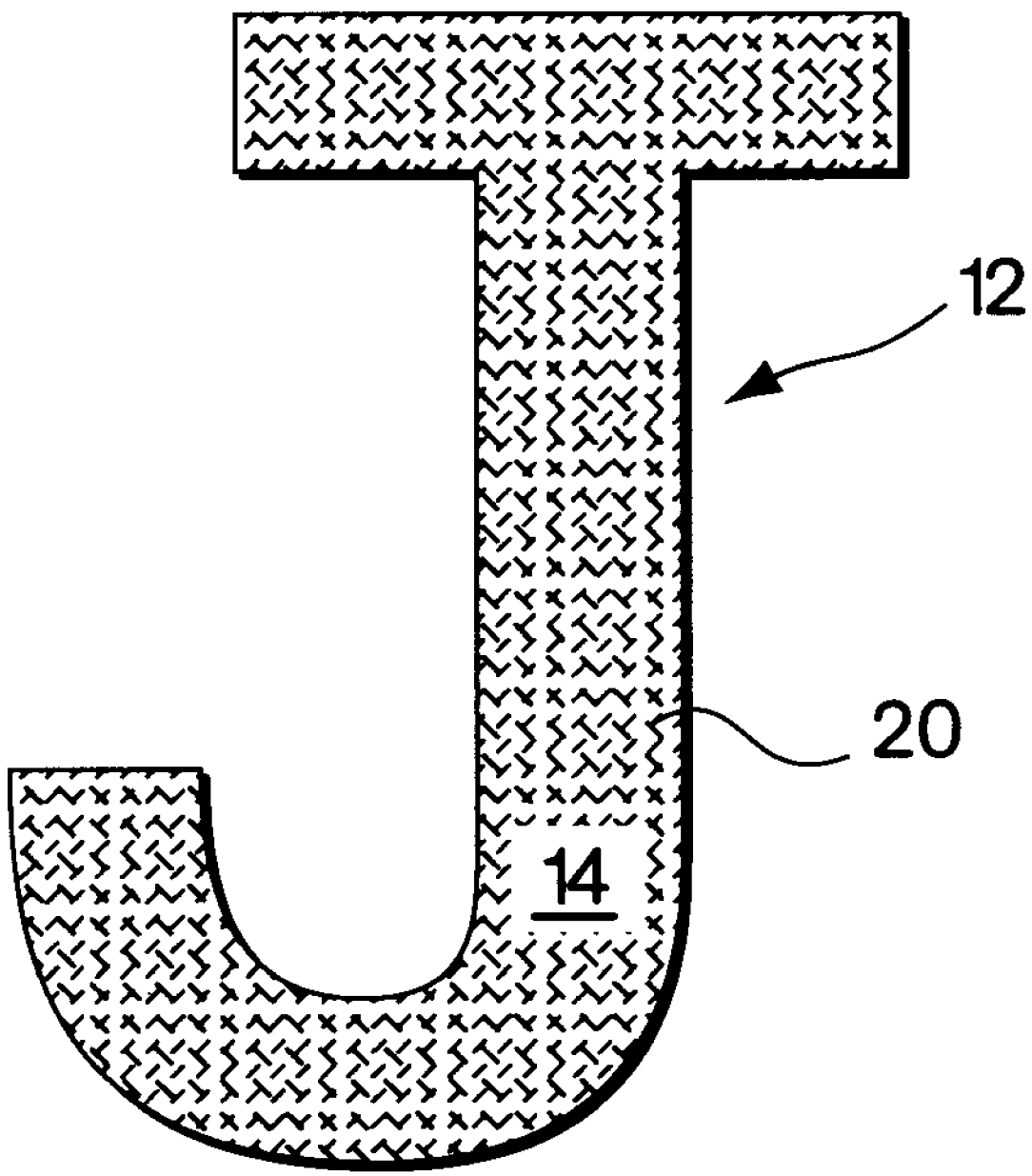
FIG. 6 is a schematic plan view of yet another alternative embodiment of the surface of a letter on a page of the book of FIG. 1.

Examples of different surfaces are shown in FIGS. 3–5. FIG. 3 shows letter 12 as the letter "A" of the alphabet having a soft, fibrous surface 14. FIG. 4 shows letter 12 as the letter "K" of the alphabet having a rough, sandpaper-like surface 14. FIG. 5 shows letter 12 as the letter "J" of the alphabet having a soft fabric surface 14. It is to be appreciated that the surfaces can vary from smooth to rough, from shiny to dull, be bumpy or soft, or have any other desired feel which can be distinguished from the feel of other letters. These different surfaces have appearances which are distinct and different from one another. Their appearance can also vary from one another through the use of different colors for different letters.

In learning the alphabet by using this book, an individual can learn using multiple senses. The individual can learn in a visual manner by seeing the letter displayed on the page. Visual learning is enhanced by the distinct appearance of the different letters. The individual can use their sense of touch to enhance learning by feeling the surface of the letter, as well as the outline of the letter which may be raised or recessed with respect to the page. Additionally, the individual can use hearing to learn by sounding out the letter themselves or by having it read aloud to them by another person. By providing visually attractive surfaces of the letters, the act of touching the letters will tend to become a spontaneous response. Additionally, saying the letter aloud will then more naturally follow. By using multiple senses, the learning process is enhanced, which is especially helpful for young children and individuals with learning disabilities.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A book to aid in the instruction of an alphabet having upper-and lower-case forms for the alphabet's letters, the book comprising:

a plurality of pages, each page having a surface and having an upper or a lower-case form of a letter on the page's surface, each form having a continuous surface which is integral to the page and is substantially offset above or below the page's surface and the offset surface of each said form having one of various combinations of appearance and feel, with the upper-case form and the lower-case form for a given letter having the same combination of appearance and feel.

2. The book set forth in claim 1 wherein:

the plurality of pages includes a first set of pages having upper-case letters and a second set of pages having lower-case letters, the sets of pages being bound into the book such that the form of the letter on a page of the first set and the form of the letter on a page of the second set are simultaneously visible and the pages in the first set and the second set are turnable independently of each other, whereby a first one of the pages having the lower-case form of a letter may be matched with a second one of the pages having the upper-case form of the same letter by means of the combination of appearance and feel shared by the lower-case and upper-case forms of the letter.

3. The book set forth in claim 2 wherein:

the combination of appearance and feel for the lower and upper-case forms of a given letter is different from that for any other of the letters.

4. The book set forth in claim 1 wherein:

the combination of appearance and feel for the lower and upper-case forms of a given letter is different from that for any other of the letters.

* * * * *